(12) United States Patent
Desbiens

(10) Patent No.: US 7,707,156 B2
(45) Date of Patent: Apr. 27, 2010

(54) DELEGATION OBJECT AS A FIRST-CLASS BUSINESS MODELING OBJECT

(75) Inventor: Marc Desbiens, Ottawa (CA)

(73) Assignee: International Business Machines Corporation, Armonk, NY (US)

(*) Notice: Subject to any disclaimer, the term of this patent is extended or adjusted under 35 U.S.C. 154(b) by 326 days.

(21) Appl. No.: 10/370,355

(22) Filed: Feb. 19, 2003

(65) Prior Publication Data

US 2005/0177532 A1    Aug. 11, 2005

(51) Int. Cl.
*G06F 17/30* (2006.01)
*G06F 7/00* (2006.01)

(52) U.S. Cl. .......................... 707/102; 707/3; 707/103

(58) Field of Classification Search ............... 707/1–10, 707/100–104.1
See application file for complete search history.

(56) References Cited

U.S. PATENT DOCUMENTS

| | | | |
|---|---|---|---|
| 5,737,606 A * | 4/1998 | Cummins | 719/315 |
| 5,915,252 A * | 6/1999 | Misheski et al. | 707/103 R |
| 6,041,306 A * | 3/2000 | Du et al. | 705/8 |
| 6,067,548 A * | 5/2000 | Cheng | 707/103 R |
| 6,587,854 B1 | 7/2003 | Guthrie et al. | |
| 7,069,267 B2 | 6/2006 | Spencer, Jr. | |
| 2002/0073080 A1 | 6/2002 | Lipkin | |
| 2003/0217063 A1 * | 11/2003 | Tomic et al. | 707/100 |
| 2004/0034615 A1 * | 2/2004 | Thomson et al. | 707/1 |
| 2004/0160385 A1 | 8/2004 | Desbiens | |

OTHER PUBLICATIONS

Emil C. Lupu and Morris Sloman, Towards A Role-Based Framework for Distributed Systems Management, 1997, Plenum Publishing Corporation, Journal of Network and Systems Management, vol. 5, No. 1, 1997.*
"Role-Based Access Control (RBAC): Features and Motivations", Article, 11th Annual Computer Security Applications Proceedings, 1995; http://hissa.ncsl.nist.gov/rbac/newpaper/rbac.html, 13 pages.
Cohen, Eve et al., "Models for Coalition-based Access Control (CBAC)", Proceedings of the seventh ACM symposium on Access control models and technologies, pp. 97-106, 2002, ACM.
Ferraiolo, David et al., "An Introduction to Role-Based Access Control", Internet Bulletin; Dec. 1995; NIST/ITL Bulletin: http://csrc.nist.gov/rbadNIST-ITL-RBAC-bulletin.html, 4 pages.

(Continued)

*Primary Examiner*—Cheyne D Ly
*Assistant Examiner*—Sangwoo Ahn
(74) *Attorney, Agent, or Firm*—Stephen J. Walder, Jr.; Erin C. Ming

(57) ABSTRACT

Method and system for partitioning and delivery data using a delegation object is disclosed. The delegation object is a first-class object, and includes a master data set definition, a data dimension-to-user mapping and a target organization definition. The target organization definition defines relationships between the master data set definition and the data dimension-to-user mapping. The delegation object is used to create a specific data set from a master data set.

24 Claims, 4 Drawing Sheets

OTHER PUBLICATIONS

Ferraiolo, David et al., "Role-Based Access Control", Proceedings of the 15th National Computer Security Conference, 1992, pp. 1-11.

McDavid, D.W. et al., "A standard for business architecture description", IBM Systems Journal, vol. 38, No. 1, 1999, 16 pages.

Canadian Office Action for Canadian Patent Application No. 2,419,239 from Canadian Intellectual Property Office dated Mar. 18, 2009.

* cited by examiner

| Action | SubPlan/Proposal | UserClass | Date/Time | Comment |
|---|---|---|---|---|
| Delivered | North America | District 1 | 11/27/2002 12:02 PM | Please have your budgets completed on time. |
| Delivered | East | CA_East | 11/27/2002 12:02 PM | Please have your budgets completed on time. |
| Delivered | Central | District 2 | 11/27/2002 12:02 PM | Please have your budgets completed on time. |
| Delivered | West | CA_West | 11/27/2002 12:02 PM | Please have your budgets completed on time. |
| Returned as tentative | East/East proposal | CA_East | 11/27/2002 12:35 PM | |
| Rejected | East/East proposal | CA_East | 11/27/2002 12:35 PM | |
| Returned as tentative | East/East proposal | CA_East | 11/27/2002 12:35 PM | |
| Accepted as final | East/East proposal | CA_East | 11/27/2002 12:35 PM | |

Figure 8

DELEGATION OBJECT AS A FIRST-CLASS BUSINESS MODELING OBJECT

FIELD OF THE INVENTION

The present invention relates generally to databases and data manipulation, and more particularly to the dimensional modeling of object-oriented databases.

BACKGROUND OF THE INVENTION

In the design of computer software systems, it is considered advantageous to associate each data item with a data type, and to present a relatively uniform interface to objects of each data type to all elements of the system. This technique allows elements of the system to rely on the characteristics of the data type, of the uniform interface to that data type. and of the relationships between that data type and other data types.

In addition to so-called "built in" data types, such as integers and floating point numbers, it is also considered advantageous to extend this technique to more complex data types, called "classes," including classes defined by the user of a system. A class represents a category of objects. For example, there might be a class called "shape" that contains objects that are circles, rectangles, and triangles. A class defines all the common properties of the different objects that belong to it. For example, a user might define a class called "telephone number", thereby allowing elements. of the system to store, manipulate, and retrieve telephone numbers as if they were fundamental pieces of information. Techniques for defining classes of data objects and restricting access to those objects are now commonplace.

The technique of defining classes of data objects and manipulating those objects has been useful in database applications as well. In object-oriented database (OODB) applications, a user defines classes of objects, properties of those classes, and relationships between those classes, and populates a database with data items that are instances of those objects. Object-oriented database management techniques now provide the advantages of rapid application and database development, as well as relative software reliability.

Today, organizations now regularly employ so-called business Intelligence (BI) tools, such as decision support systems (DSS) that leverage object-oriented data management techniques to enhance their managers' ability to make timely and accurate decisions by presenting data gathered for them from a wide range of sources. With the decisions being made by senior management often based on information passed to them by subordinates, and subordinates typically receiving only that information relevant to their area of responsibility, the result has been that the dissemination of data often falls along areas of responsibility, and therefore mimics the hierarchal structure of a business.

The problem is that today's information systems, particularly in the area of planning, have typically had to rely on manual techniques or scripts to extract data for individual users. These techniques require a high level of maintenance and are limited in their ability to track changes to delivered data sets.

What is needed is a way to provide a formal, single point of reference for defining how a data set is to be populated or "burst" across the organizational structure of a business to provide a single central location for maintenance, as well as to effectively track changes to those generated data sets, all in accordance with the superior performance of object-oriented data management techniques.

For the foregoing reasons, there is a need for an improved method and system for modeling the partitioning and delivery of data within an object-oriented organizational model.

SUMMARY OF THE INVENTION

The present invention is directed to a delegation object as a first-class business modeling object, and method and system for providing same. The delegation object includes a master data set definition, at least one data dimension-to-user mapping, and a target organization definition defining relationships between the master data set definition and the mapping.

The method includes the steps of defining a master data set, mapping at least one data dimension to a user, and defining relationships between the master data set and the mapping.

The system includes module for defining a master data set, module for mapping at least one data dimension to a user, and module for defining relationships between the master data set and the mapping.

In an aspect of the present invention, the mapping is an organizational hierarchy description.

A delegation object is a uniquely named first-class business modeling object that provides a reusable definition that describes how to partition and deliver data. A delegation object enables a single-source data set to be extracted into multiple data sets by automating the generation of data sets based on an application's organizational hierarchy and functional security model. Since delegation objects are fully modifiable, target data sets can be renamed, and an organizational hierarchy, defining the contents of each generated data set, can be changed. As well, the delegation object keeps track of changes to the data sets over time. The delegation object also provides control to shutdown and clean up the entire process.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

These and other features, aspects, and advantages of the present invention will become better understood with regard to the following description, appended claims, and accompanying drawings where:

FIG. 6 Illustrates a delegation deadline window;

FIG. 7 illustrates a notification message window; and

FIG. 8 illustrates a delegation history monitor window.

DETAILED DESCRIPTION OF THE PRESENTLY PREFERRED EMBODIMENT

Figure 1:
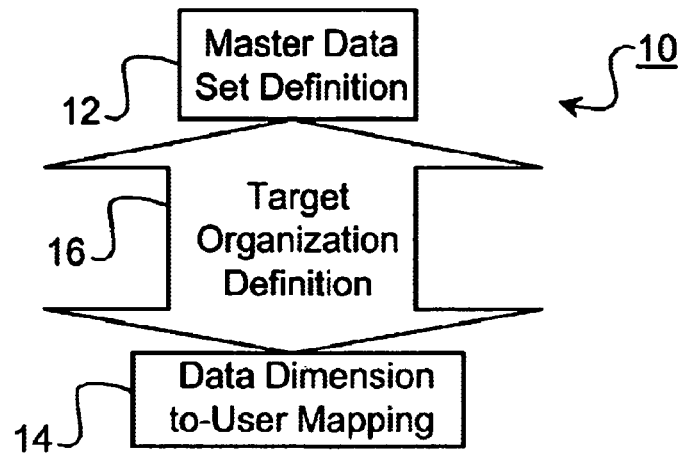
FIG. 1 is an overview of a delegation object in accordance with an embodiment of the present invention.

An embodiment of the present invention is directed to a delegation object 10 as a first-class business modeling object, and method and system for providing same. As illustrated in FIG. 1, the delegation object 10 includes a master data set definition 12, at least one data dimension-to-user mapping 14, and a target organization definition 16 defining relationships between the master data set definition 12 and the mapping 14.

Figure 2:
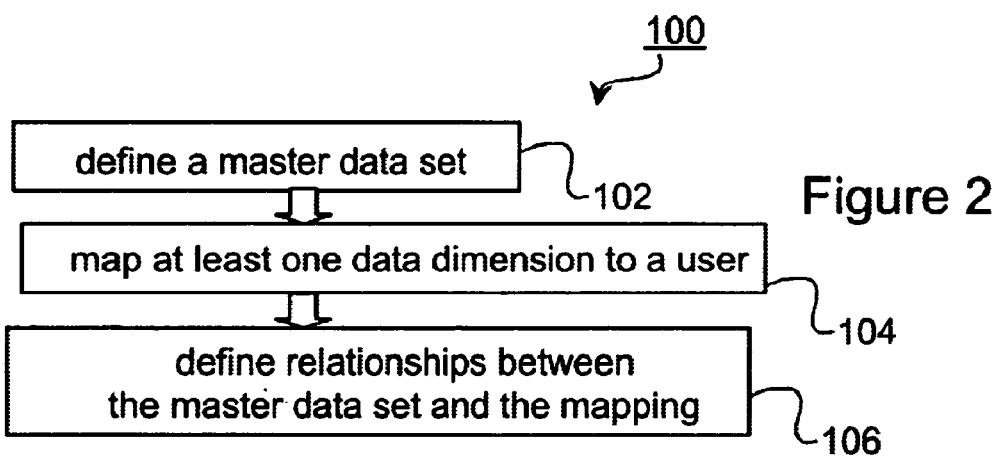
FIG. 2 is an overview of a method for providing a delegation object in accordance with an embodiment of the present invention.

As illustrated in FIG. 2, the method 100 includes the steps of defining a master data set 102, mapping at least one data dimension to a user 104, and defining relationships between the master data set and the mapping 106.

Figure 3:
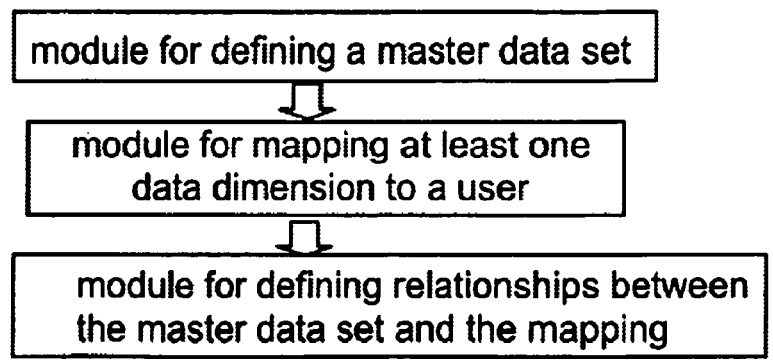
FIG. 3 illustrates an overview of a system for providing a delegation object in accordance with an embodiment of the present invention.

As illustrated in FIG. 3, the system includes module for defining a master data set, module for mapping at least one data dimension to a user, and module for defining relationships between the master data set and the mapping.

In an embodiment of the present invention, the mapping is an organizational hierarchy description. A delegation object 10 can further include a delegation description. This property gives context to a delegation object 10 and is advantageous for documenting the process in which the delegation is used. A delegation object 10 can further include a delegation schedule, providing functionality by which "deadlines" and "reminders" can be associated with data sets generated by a delegation object 10.

As well, a delegation object 10 can further include a notification and/or attachment to that notification. The generation and delivery of data sets by a delegation object 10 can include an appropriate notification message with or without attachments via e-mail. In addition, delegation object 10s are capable of tracking changes to delivered data sets, and providing "deadlines" and "reminders" to target users.

The relationship between dimensional data and management roles to establish areas of responsibility, provided by the data dimension-to-user mapping 14, is described in detail in co-pending U.S. patent application, entitled "Organization Object as a First-Class Business Modeling Object, and Method and System for Providing Same" and filed on Feb. 19, 2003, the teachings of which are hereby incorporated by reference in their entirety. A delegation object 10 contains a reference to an organization object in order to define how a master data set is to be broken out and delivered.

The master data set definition 12 identifies the master data set from which all data sets will be generated. The target organization definition 16 defines the set of mappings between dimension categories and user identifiers. This property can be a reference to an organization object as described above or may simply be one or more individual mappings. A "quick delegation" can be used and is defined as a delegation that does not reference an organization object, but that contains a data dimension-to-user mapping 14 that is dynamically specified.

The delegation object 10 defines a master data set and defines the organization hierarchy by which specific data sets will be generated from the master data set. A delegation object 10 automates the creation and delivery of data sets and keeps track of changes to data sets over time, and provides control to shutdown and clean up the entire process.

Since delegation objects 10 are definitions that are to be acted upon, delegation objects 10 need to support basic actions. A delegation object 10 is "run" in order for data sets to be generated. In order to end the workflow process started by the delegation, a delegation is simply "closed". Further, in order for data sets to get cleaned up, a user simply cancels the delegation.

Figure 4:
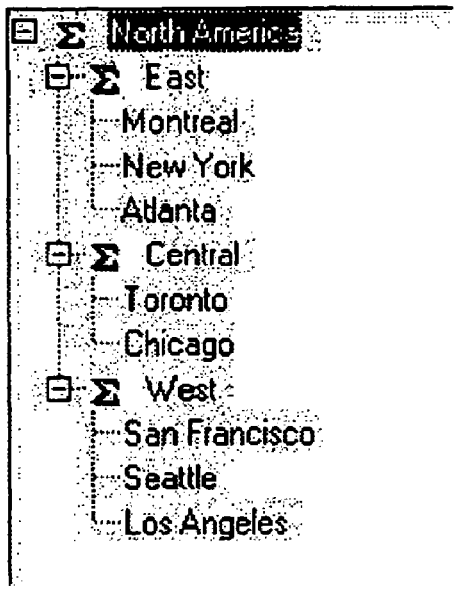
FIG. 4 illustrates a management structure.
Figure 5:
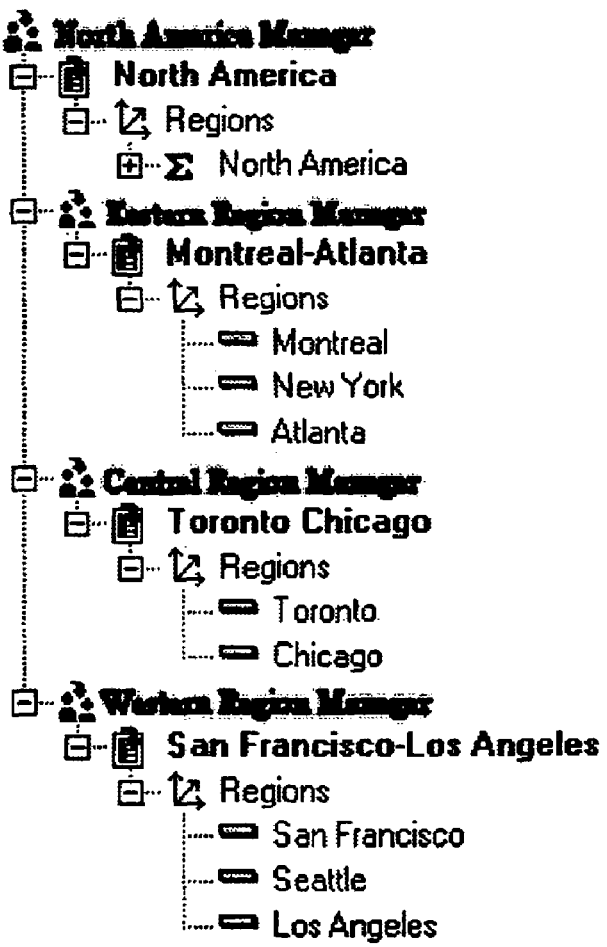
FIG. 5 illustrates the management structure with assigned role.

In the following example, ABC Inc. has created a new budget that requires distribution to all responsible levels of management with the organization. Further, changes to the budget process need to be tracked and the final budget presented to the companies board for approval. ABC Inc. maintains a management structure based on its regional distribution, as illustrated in FIG. 4. This region hierarchy illustrates that the "East", "Central" and "West" regions all roll up into the "North America" region. As well, the company has assigned a management role to each level of the management hierarchy, as illustrated in FIG. 5. From FIG. 5, one can see that the "North America" manager is responsible for the "North America" region, the "Eastern Region Manager" is responsible for the eastern region and so on.

Figures 6, 7:
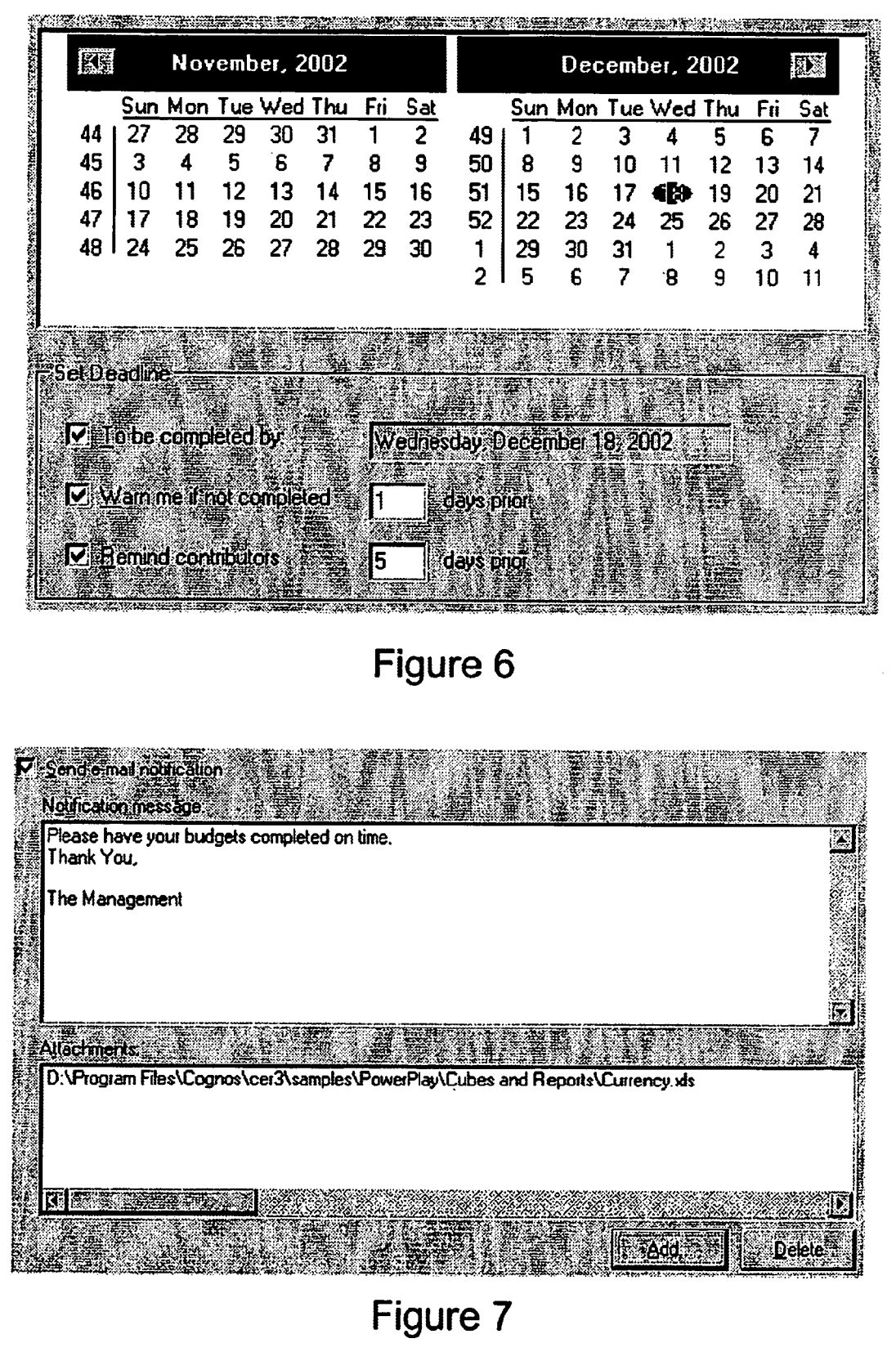

In accordance with the aforementioned, the budget manager for ABC Inc. creates a new delegation. The budget manager then assigns the budget as the delegation's master data set and selects the organization illustrated in FIG. 5. As illustrated in FIG. 6, the budget manager can optionally set a deadline for all data sets, and/or as illustrated in FIG. 7, add a notification message to the delegation.

Once the delegation definition has been completed, the budget manager "runs" the delegation, causing all of the pre-defined data sets to be generated and delivered. Users defined in the organizational structure of the delegation are notified, and the delegation's history is updated. As well, delegation objects 10 are automatically updated as delivered data sets are modified. In addition, as illustrated in FIG. 8, the budget manager that created the delegation can monitor the delegation's history for changes. A user can automate the deletion of generated data sets by "canceling" a delegation object 10. Further, a user can change their data sets by "closing" a delegation object 10. "Closing" a delegation restricts further changes to the datasets generated by the delegation. "Closing" a delegation can also cause the individual data sets to get updated from the master data source.

Since organizations typically have a built-in management hierarchy that defines specific areas of responsibility within the company, by using a delegation object 10, data sets defining specific data relationships can be generated and distributed based on this management hierarchy. Each level of the management hierarchy receives a subset of the master data set based on its level of responsibility, controlled through an application's security model. Delegation objects 10 provide a formal definition of the process of companies distributing information within business organizations in order to facilitate decision-making at different levels.

A delegation object 10 is a uniquely named first-class business modeling object that provides a reusable definition that describes how to partition and deliver data. A delegation object 10 enables a single-source data set to be extracted into multiple data sets by automating the generation of data sets based on an application's organizational hierarchy and functional security model. Since delegation objects 10 are fully modifiable, target data sets can be renamed, and an organizational hierarchy, defining the contents of each generated data set, can be changed. As well, the delegation object keeps track of changes to the data sets over time. The delegation object 10 also provides control to shut down and clean up the entire process.

Although the present invention has been described in considerable detail with reference to certain preferred embodiments thereof, other versions are possible. Therefore, the spirit and scope of the appended claims should not be limited to the description of the preferred embodiments contained herein.

What is claimed is:

1. A method, in a data processing device having a processor and a storage medium, for providing data comprising:
  defining, by the processor implementing a first module of the data processing device, a master data set in a database stored on the storage medium, the master data set comprising data to be transferred to a plurality of users of an organization;
  generating, by the processor implementing a second module of the data processing device, a delegation object providing a reusable definition to enable a single-source data set of the database to be extracted into one or more specific data sets of the database; the delegation object comprising a data dimension-to-user mapping and a target organization definition defining relationships between the master data set definition and the data dimension-to-user mapping; wherein the delegation object is a uniquely named first-class business modeling object for partitioning and delivering the master data set, and wherein the data dimension-to-user mapping is an organizational hierarchy description describing relationships between the users in the plurality of users of the organization, each level of the organizational hierarchy having an associated management role parameter identifying a level of responsibility associated with the level of the organizational hierarchy; and partitioning and distributing, by the processor of the data processing device, the master data set using the delegation object to create a specific data set for each user in the plurality of users of the organization based on the data dimension-to-user mapping and target organization definition, wherein each specific data set corresponds to a management role parameter assigned to a level of the organizational hierarchy in which a corresponding user is positioned.

2. The method according to claim 1, wherein the delegation object further comprises a delegation description for documenting the process used by the delegation.

3. The method according to claim 1, wherein the delegation object further comprises a delegation schedule for associating dates with data sets.

4. The method according to claim 1, wherein the specific data set further comprises notification messages.

5. The method according to claim 1, further comprising tracking, by the delegation object, changes of the specific data sets over time.

6. The method according to claim 1, further comprising cancelling the partitioning and distributing operation, whereby the created specific data sets are deleted.

7. The method according to claim 1, further comprising closing the delegation object such that the partitioning and distributing operation is canceled to restrict changes to the created specific data sets.

8. The method according to claim 1, wherein the master data set is a single source data set.

9. A data processing system for providing data comprising:
a processor; and
a storage medium coupled to the processor, wherein the processor and storage medium together operate to provide:
a first module that defines a master data set in a database, the master data set comprising data to be transferred to a plurality of users of an organization; and
a second module that defines a delegation object providing a reusable definition to enable a single-source data set of the database to be extracted into one or more specific data sets of the database; the delegation object comprising a data dimension-to-user mapping; and a target organization definition defining relationships between the master data set definition and the data dimension-to-user mapping, wherein:
the delegation object is a uniquely named first-class business modeling object for partitioning and delivering the master data set,
the data dimension-to-user mapping is an organizational hierarchy description describing relationships between the users in the plurality of users of the organization, each level of the organizational hierarchy having an associated management role parameter identifying a level of responsibility associated with the level of the organizational hierarchy, and the data processing system partitions and distributes the master data set using the delegation object to create a specific data set for each user in the plurality of users of the organization based on the data dimension-to-user mapping and target organization definition, wherein each specific data set corresponds to a management role parameter assigned to a level of the organizational hierarchy in which a corresponding user is positioned.

10. The system according to claim 9, wherein the delegation object further comprises a delegation description for documenting the process used by the delegation.

11. The system according to claim 9, wherein the delegation object further comprises a delegation schedule for associating dates with data sets.

12. The system according to claim 9, wherein the specific data set further comprises notification messages.

13. The system according to claim 9, wherein the delegation object tracks changes of the specific data sets over time.

14. The system according to claim 9, wherein, in response to cancelling the partitioning and distributing operation, the created specific data sets are deleted.

15. The system according to claim 9, wherein, in response to closing the delegation object, the partitioning and distributing operation restricts changes to the created specific data sets.

16. The system according to claim 9, wherein the master data set is a single source data set.

17. A computer program product for use on a computer system for providing data, the computer program product comprising a computer usable storage medium having computer readable program code thereon, the computer readable program code comprising:
program code for defining a master data set in a database, the master data set comprising data to be transferred to a plurality of users of an organization;
program code for generating a delegation object providing a reusable definition to enable a single-source data set of the database to be extracted into one or more specific data sets of the database; the delegation object comprising a data dimension-to-user mapping; and a target organization definition defining relationships between the master data set definition and the data dimension-to-user mapping, wherein:
the delegation object is a uniquely named first-class business modeling object for partitioning and delivering the master data set, and wherein the data dimension-to-user mapping is an organizational hierarchy description describing relationships between the users in the plurality of users of the organization, each level of the organizational hierarchy having an associated management role parameter identifying a level of responsibility associated with the level of the organizational hierarchy; and
program code for partitioning and distributing the master data set using the delegation object to create a specific data set for each user in the plurality of users of the organization based on the data dimension-to-user mapping and target organization definition, wherein each specific data set corresponds to a management role parameter assigned to a level of the organizational hierarchy in which a corresponding user is positioned.

18. The computer program product according to claim 17, wherein the delegation object further comprises a delegation description for documenting the process used by the delegation.

19. The computer program product according to claim 17, wherein the delegation object further comprises a delegation schedule for associating dates with data sets.

20. The computer program product according to claim 17, wherein the specific data set further comprises notification messages.

21. The computer program product according to claim 17, further comprising program code for tracking, by the delegation object, changes of the specific data sets over time.

22. The computer program product according to claim 17, further comprising program code for cancelling the partitioning and distributing operation, whereby the created specific data sets are deleted.

23. The computer program product according to claim 17, further comprising program code for closing the delegation object to restrict changes to the created specific data sets.

24. The computer program product according to claim 17, wherein the master data set is a single source data set.

\* \* \* \* \*